(12) United States Patent
Tang et al.

(10) Patent No.: US 11,039,341 B2
(45) Date of Patent: Jun. 15, 2021

(54) METHOD AND APPARATUS FOR SCHEDULING VOICE SERVICE IN PACKET DOMAIN

(71) Applicant: HUAWEI TECHNOLOGIES CO., LTD., Guangdong (CN)

(72) Inventors: Xin Tang, Shanghai (CN); Yanbo Yang, Shenzhen (CN); Ming Li, Shanghai (CN); Yuejun Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/195,321

(22) Filed: Nov. 19, 2018

(65) Prior Publication Data
US 2019/0090160 A1    Mar. 21, 2019

Related U.S. Application Data

(63) Continuation of application No. PCT/CN2016/082786, filed on May 20, 2016.

(51) Int. Cl.
*H04W 28/22*      (2009.01)
*H04L 12/853*     (2013.01)
(Continued)

(52) U.S. Cl.
CPC ......... *H04W 28/22* (2013.01); *H04L 47/2416* (2013.01); *H04L 65/1069* (2013.01);
(Continued)

(58) Field of Classification Search
CPC ............. H04W 28/22; H04W 72/1236; H04W 72/1226; H04W 28/16; H04W 80/02; H04L 47/2416; H04L 65/1069; H04L 65/80
See application file for complete search history.

(56) References Cited

U.S. PATENT DOCUMENTS 6,477,670 B1   11/2002   Ahmadvand
7,200,154 B1    4/2007   Wu et al.
(Continued)

FOREIGN PATENT DOCUMENTS

CN    1883223 A      12/2006
CN    101499836 A     8/2009
(Continued)

OTHER PUBLICATIONS

Extended European Search Report issued in European Application No. 16902020.3 dated Mar. 13, 2019, 7 pages.
(Continued)

*Primary Examiner* — Jay P Patel
(74) *Attorney, Agent, or Firm* — Fish & Richardson P.C.

(57) ABSTRACT

Embodiments of the present invention provide a method and an apparatus for scheduling a voice service in a packet domain. The method includes: obtaining at least one value of a first scheduling parameter corresponding to each protocol sublayer of L2 of a voice service, determining a condition needing to be satisfied by quality of service of the voice service, determining a value of a service scheduling parameter of the voice service based on the condition needing to be satisfied by the quality of service of the voice service and based on the at least one value of the first scheduling parameter, and scheduling the voice service based on the value of the service scheduling parameter of the voice service. In this way, a service scheduling parameter is adjusted at an appropriate time when a particular condition is satisfied, so that transmission quality of a link can be ensured.

14 Claims, 2 Drawing Sheets

(51) Int. Cl.
*H04W 72/12* (2009.01)
*H04L 29/06* (2006.01)
*H04W 28/16* (2009.01)
*H04W 80/02* (2009.01)

(52) U.S. Cl.
CPC ............ *H04L 65/80* (2013.01); *H04W 28/16* (2013.01); *H04W 72/1226* (2013.01); *H04W 72/1236* (2013.01); *H04W 80/02* (2013.01)

(56) References Cited

U.S. PATENT DOCUMENTS

| | | | | |
|---|---|---|---|---|
| 8,615,271 | B2* | 12/2013 | Chuberre | H04B 1/406 455/553.1 |
| 9,763,226 | B2* | 9/2017 | Wu | H04W 28/24 |
| 10,091,707 | B2* | 10/2018 | Lee | H04W 48/12 |
| 10,111,231 | B2* | 10/2018 | Lee | H04W 72/048 |
| 2003/0007517 | A1* | 1/2003 | Beckmann | H04B 7/2612 370/537 |
| 2004/0024791 | A1* | 2/2004 | Martin | H04B 7/18563 |
| 2004/0028078 | A1* | 2/2004 | Beckmann | H04L 45/245 370/469 |
| 2004/0085932 | A1* | 5/2004 | Jiang | H04W 76/27 370/332 |
| 2005/0113099 | A1 | 5/2005 | Eriksson et al. | |
| 2006/0268837 | A1 | 11/2006 | Larsson et al. | |
| 2007/0002801 | A1 | 1/2007 | Usuda et al. | |
| 2007/0014229 | A1* | 1/2007 | Hepler | H04L 49/9057 370/208 |
| 2007/0291695 | A1* | 12/2007 | Sammour | H04W 36/02 370/331 |
| 2009/0196363 | A1 | 8/2009 | Suda et al. | |
| 2010/0062724 | A1 | 3/2010 | Fok et al. | |
| 2010/0118892 | A1* | 5/2010 | Nguyen | H04W 88/02 370/474 |
| 2010/0165857 | A1 | 7/2010 | Meylan et al. | |
| 2010/0265862 | A1* | 10/2010 | Choi | H04W 52/265 370/311 |
| 2010/0315968 | A1 | 12/2010 | Zhou et al. | |
| 2011/0199998 | A1 | 8/2011 | Yi et al. | |
| 2012/0033563 | A1* | 2/2012 | Jazra | H04L 47/2433 370/252 |
| 2012/0083264 | A1* | 4/2012 | Ramasamy | H04W 52/262 455/425 |
| 2012/0093127 | A1 | 4/2012 | Suzuki | |
| 2012/0147836 | A1* | 6/2012 | Ishii | H04W 72/1268 370/329 |
| 2013/0165084 | A1* | 6/2013 | Xu | H04L 67/02 455/414.1 |
| 2013/0286868 | A1* | 10/2013 | Oyman | H04L 47/70 370/252 |
| 2014/0088963 | A1 | 3/2014 | Wei et al. | |
| 2014/0126527 | A1* | 5/2014 | Xiong | H04W 72/1278 370/329 |
| 2014/0128092 | A1* | 5/2014 | Xiong | H04W 88/06 455/454 |
| 2014/0153392 | A1* | 6/2014 | Gell | H04W 28/0236 370/230 |
| 2014/0155043 | A1* | 6/2014 | Gell | H04W 4/60 455/414.1 |
| 2014/0192799 | A1 | 7/2014 | Huang et al. | |
| 2015/0264631 | A1* | 9/2015 | Zhang | H04W 48/08 370/329 |
| 2016/0088635 | A1* | 3/2016 | Davydov | H04L 1/0026 370/329 |
| 2016/0100230 | A1* | 4/2016 | Ma | H04N 21/6125 725/109 |
| 2016/0183281 | A1* | 6/2016 | Yeh | H04J 3/0614 370/332 |
| 2017/0099118 | A1* | 4/2017 | Negalaguli | H04L 1/0026 |
| 2017/0118707 | A1* | 4/2017 | Bharadwaj | H04W 52/028 |
| 2017/0202005 | A1* | 7/2017 | Madan | H04W 72/1231 |
| 2017/0215201 | A1* | 7/2017 | Kim | H04L 5/005 |
| 2017/0303287 | A1* | 10/2017 | Yu | H04L 67/146 |
| 2018/0338344 | A1* | 11/2018 | Gustafsson | H04L 1/1812 |

FOREIGN PATENT DOCUMENTS

| | | |
|---|---|---|
| CN | 101517994 A | 8/2009 |
| CN | 101809948 A | 8/2010 |
| CN | 101945440 A | 1/2011 |
| CN | 102571265 A | 7/2012 |
| CN | 102752087 A | 10/2012 |
| EP | 2838222 B1 | 11/2018 |
| JP | 2008011258 A | 1/2008 |
| JP | 2008538685 A | 10/2008 |
| JP | 2008543168 A | 11/2008 |
| JP | 2010506457 A | 2/2010 |
| JP | 2010288277 A | 12/2010 |
| JP | 2014519742 A | 8/2014 |
| KR | 20090078811 A | 7/2009 |
| WO | 2006104773 A1 | 10/2006 |
| WO | 2006116027 A1 | 11/2006 |
| WO | 2006126964 A2 | 11/2006 |
| WO | 2006135201 A1 | 12/2006 |
| WO | 2011001469 A1 | 1/2011 |
| WO | 2011144112 A2 | 11/2011 |

OTHER PUBLICATIONS

International Search Report and Written Opinion issued in International Application No. PCT/CN2016/082786 dated Feb. 14, 2017, 15 pages.
Office Action issued in Japanese Application No. 2018-560872 dated Sep. 17, 2019, 11 pages (with English translation).
Office Action issued in Korean Application No. 2018-7036389 dated Sep. 20, 2019, 6 pages (with English translation).
Office Action issued in Chinese Application No. 201680085030.4 dated Feb. 25, 2020, 8 pages.
Office Action issued in Japanese Application No. 2018-560872 dated Nov. 9, 2020, 5 pages (with English translation).

\* cited by examiner

METHOD AND APPARATUS FOR SCHEDULING VOICE SERVICE IN PACKET DOMAIN

CROSS-REFERENCE TO RELATED APPLICATIONS

This application is a continuation of International Application No. PCT/CN2016/082786, filed on May 20, 2016, the disclosure of which is hereby incorporated by reference in its entirety.

TECHNICAL FIELD

Embodiments of the present invention relate to the field of wireless communications technologies, and more specifically, to a method and an apparatus for scheduling a voice service in a packet domain.

BACKGROUND

As technologies develop, high bandwidth provided by Long Term Evolution (LTE) provides an opportunity for vigorous development of mobile bandwidth. In data transmission over a radio link, parameters are fixed in the entire transmission, but actual conditions may be different during the transmission over the entire link. In this case, transmission quality of the link cannot be ensured.

In the prior art, for a common data service of LTE, a network side device may use an adaptive modulation and coding (AMC) technology to adjust a parameter such as a modulation scheme or an encoding rate in transmission over a radio link, to ensure transmission quality of the link.

Compared with the common data service of LTE, a Voice Over LTE (VoLTE) service has particular characteristics. A network side device generally generates a VoLTE service periodically, for example, generates one voice packet having a fixed size every 20 ms, so that a maximum throughput of a Media Access Control (MAC) layer has a fixed value in transmission of the VoLTE service. In this case, if a conventional method for adaptive modulation and coding of a common data service is used to perform adaptive modulation and coding on the VoLTE service, because the maximum throughput of the MAC layer has a fixed value, an MCS that is eventually determined and used is fixed. Consequently, an appropriate MCS cannot be selected at an appropriate time, that is, adaptive modulation and coding cannot be performed, and, transmission quality of a link in the transmission of the VoLTE service cannot be ensured.

In addition, in the prior art, there is no adaptive adjustment method for other parameters such as a quantity of retransmissions and a discard-timer period in transmission of a VoLTE service, making it very difficult to ensure transmission quality of a link in the transmission of the VoLTE service.

SUMMARY

Embodiments of the present invention provide a method and an apparatus for scheduling a voice service in a packet domain, to ensure transmission quality of a link.

A first aspect provides a method for scheduling a voice service in a packet domain, including: obtaining at least one value of a first scheduling parameter corresponding to each protocol sublayer of at least two protocol sublayers of L2 of a voice service; determining a condition needing to be satisfied by quality of service of the voice service; determining a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service; and scheduling the voice service based on the value of the service scheduling parameter of the voice service.

In the embodiments of the present invention, the value of the service scheduling parameter of the voice service is determined based on scheduling parameters of different protocol sublayers of L2 of the voice service and the condition needing to be satisfied by the quality of service of the voice service, and the voice service is scheduled based on the value of the scheduling parameter of the voice service. In this way, transmission quality of a link can be ensured.

Specifically, the voice service in the embodiments of the present invention may be a VoLTE service. In this case, the value of the service scheduling parameter of the VoLTE service may be determined based on the condition needing to be satisfied by the quality of service, and the voice service in transmission of the VoLTE is scheduled, to ensure transmission quality of the VoLTE service.

The at least two protocol sublayers in the embodiments of the present invention may include at least one protocol sublayer of the following: a Radio Link Control (RLC) layer, a Packet Data Convergence Protocol (PDCP) layer, and a MAC layer.

The first scheduling parameter in the embodiments of the present invention may be an MCS. In this case, MCSs of the RLC layer, the PDCP layer, and the MAC layer may be considered, to select an appropriate MCS to perform adaptive modulation and coding on the transmitted voice service.

The first scheduling parameter in the embodiments of the present invention may be a quantity of retransmissions. Quantities of retransmissions of the RLC layer, the PDCP layer, and the MAC layer may be considered, to select an appropriate quantity of retransmissions to perform adaptive retransmission of the transmitted voice service.

The first scheduling parameter in the embodiments of the present invention may be a discard-timer period. Discard-timer periods of the RLC layer, the PDCP layer, and the MAC layer may be considered, to select an appropriate discard-timer period to perform adaptive adjustment of a PDCP buffer size for the transmitted voice service.

With reference to the first aspect, in an implementation of the first aspect, the first scheduling parameter includes any one scheduling parameter of the following: a modulation and coding scheme MCS, a quantity of retransmissions, and a discard-timer period; and the obtaining at least one value of a first scheduling parameter corresponding to each protocol sublayer of at least two protocol sublayers of L2 of a voice service includes: selecting, based on two scheduling parameters other than the first scheduling parameter of the foregoing three scheduling parameters, a value from a threshold range corresponding to a first protocol sublayer, to obtain at least one value of a first scheduling parameter of the first protocol sublayer, where the first protocol sublayer is one of the at least two protocol sublayers of L2 of the voice service; and calculating, based on the at least one value of the first scheduling parameter of the first protocol sublayer, or configuring at least one value of a first scheduling parameter corresponding to another protocol sublayer of the at least two protocol sublayers of L2 of the voice service.

With reference to the first aspect and the foregoing implementation of the first aspect, in another implementation of the first aspect, the condition needing to be satisfied by the quality of service of the voice service is that a voice quality mean opinion score (MOS) of the voice service is optimal, and the determining a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service includes: determining at least one throughput of the corresponding first protocol sublayer based on the at least one value of the first scheduling parameter of the first protocol sublayer; determining at least one throughput of another protocol sublayer in a one-to-one correspondence to the at least one throughput of the first protocol sublayer; determining corresponding at least one voice quality MOS of the voice service based on the at least one throughput of the first protocol sublayer and the at least one throughput of the another protocol sublayer; and selecting a value of a first scheduling parameter corresponding to an optimal voice quality MOS of the at least one voice quality MOS of the voice service as the value of the service scheduling parameter of the voice service.

In an embodiment of the present invention, a corresponding value of the first scheduling parameter when the voice quality MOS is optimal may be selected as the value of the service scheduling parameter of a voice service. In this way, voice quality in transmission of the voice service can be ensured. For example, for the VoLTE service, a corresponding value of the first scheduling parameter when the voice quality MOS of the VoLTE service is optimal may be selected as the value of the service scheduling parameter to schedule the voice service in transmission of VoLTE, to ensure voice quality in service transmission.

With reference to the first aspect and the foregoing implementations of the first aspect, in another implementation of the first aspect, the condition needing to be satisfied by the quality of service of the voice service is that a throughput of the voice service is maximum, and the determining a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service includes: determining at least one throughput of the corresponding first protocol sublayer based on the at least one value of the first scheduling parameter of the first protocol sublayer; determining at least one throughput of another protocol sublayer in a one-to-one correspondence to the at least one throughput of the first protocol sublayer; determining corresponding at least one throughput of the voice service based on the at least one throughput of the first protocol sublayer and the at least one throughput of the another protocol sublayer; and selecting a value of a first scheduling parameter corresponding to a maximum throughput of the at least one throughput of the voice service as the value of the service scheduling parameter of the voice service.

With reference to the first aspect and the foregoing implementations of the first aspect, in another implementation of the first aspect, the condition needing to be satisfied by the quality of service of the voice service is that a transmission rate of the voice service is maximum, and the determining a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service includes: determining at least one value of the service scheduling parameter, where each value of the service scheduling parameter is a maximum value selected from one value of the first scheduling parameter of the first protocol sublayer and one value of a first scheduling parameter of corresponding each of other protocol sublayers; and selecting a maximum value of the at least one value of the service scheduling parameter as the value of the service scheduling parameter of the voice service.

With reference to the first aspect and the foregoing implementations of the first aspect, in another implementation of the first aspect, the condition needing to be satisfied by the quality of service of the voice service is that a bit error rate of the voice service is minimum, and the determining a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service includes: determining at least one value of the service scheduling parameter, where each value of the service scheduling parameter is a minimum value selected from one value of the first scheduling parameter of the first protocol sublayer and one value of a first scheduling parameter of corresponding each of other protocol sublayers; and selecting a minimum value of the at least one value of the service scheduling parameter as the value of the service scheduling parameter of the voice service.

With reference to the first aspect and the foregoing implementations of the first aspect, in another implementation of the first aspect, the first scheduling parameter is an MCS; and the selecting, based on two scheduling parameters other than the first scheduling parameter of the foregoing three scheduling parameters, a value from a threshold range corresponding to a first protocol sublayer, to obtain at least one value of a first scheduling parameter of the first protocol sublayer includes: determining at least one fragment quantity of the first protocol sublayer based on a plurality of quantities of retransmissions in a threshold range of the quantity of retransmissions, a plurality of discard-timer periods in a threshold range of the discard-timer period, and an on/off state of a transmission time interval bundling TTIB switch, where each fragment quantity of the first protocol sublayer corresponds to one quantity of retransmissions and one discard-timer period; determining at least one fragment size of the first protocol sublayer based on a maximum buffer data size on the another protocol sublayer, the at least one fragment quantity of the first protocol sublayer, and a header data size of the first protocol sublayer; and determining at least one MCS of the first protocol sublayer based on the at least one fragment size of the first protocol sublayer.

In an embodiment of the present invention, a plurality of fragment quantities of the RLC layer may be determined based on the plurality of quantities of retransmissions in the threshold range of the quantity of retransmissions, the plurality of discard-timer periods in the threshold range of the discard-timer period, and the on/off state of the transmission time interval bundling TTIB switch. For example, a product of multiplying a status value of the TTIB switch by the quantity of retransmissions is denoted as A, and each fragment quantity may be obtained by dividing the discard-timer period by A. Alternatively, each fragment quantity may be obtained by rounding a decimal that is obtained by dividing the discard-timer period by A and from which a particular quantity of digits are kept.

In an embodiment of the present invention, a fragment size of the RLC layer may be determined based on a buffer data size on the PDCP layer, a fragment quantity of the RLC layer, and a header data size of the RLC layer. For example, a quotient of dividing the buffer data size on the PDCP layer by the fragment quantity of the RLC layer is denoted as B, and the fragment size of the RLC layer may be obtained by adding the header data size of the RLC layer to B.

With reference to the first aspect and the foregoing implementations of the first aspect, in another implementation of the first aspect, the first scheduling parameter includes any one scheduling parameter of the following: an MCS, a quantity of retransmissions, a discard-timer period, a PDCP buffer size, and a fragment quantity of the RLC layer.

With reference to the first aspect and the foregoing implementations of the first aspect, in another implementation of the first aspect, the first protocol sublayer is a Radio Link Control RLC layer, and the another protocol sublayer includes a Packet Data Convergence Protocol PDCP layer and a Media Access Control MAC layer.

The first scheduling parameter in the embodiments of the present invention may be any one parameter in transmission of the VoLTE service. In an embodiment of the present invention, parameter values corresponding to the RLC layer, the PDCP layer, and the MAC layer may be estimated according to the method in the embodiments of the present invention, and an appropriate parameter is selected for transmission of the VoLTE service. In this way, transmission quality of a link can be ensured.

When the method for scheduling a voice service in the embodiments of the present invention is applied to a quality of service (QoS) class identifier (QCI) 1 service or a QCI 2 service, transmission quality of a link can be ensured more effectively. The first scheduling parameter of the PDCP layer in the embodiments of the present invention may be obtained based on the first scheduling parameter corresponding to the RLC layer. For example, a throughput of the RLC layer may be obtained based on an MCS of the RLC layer, and a throughput of the PDCP layer is obtained based on the throughput of the RLC layer and a transmission efficiency factor. The throughput of the PDCP layer may be considered as a linear function of an MCS of the PDCP layer. Therefore, the MCS of the PDCP layer may be obtained by using the throughput of the PDCP layer. In this way, if the first scheduling parameter is an MCS, the MCS of the PDCP layer may be obtained based on the MCS of the RLC layer.

The quantity of retransmissions and the discard-timer period of the PDCP layer in the embodiments of the present invention may both be configured as independent parameters.

Different quantities of retransmissions and discard-timer periods may be independently configured on the PDCP layer. In addition, retransmission is generally not considered on the PDCP layer. In this case, it may be considered that the quantity of retransmissions of the PDCP layer is 1.

The first scheduling parameter of the MAC layer in the embodiments of the present invention may be obtained by estimating channel quality (e.g. Channel Quality Indicator, CQI). For example, if the first scheduling parameter is an MCS, a network side device may obtain the MCS of the MAC layer based on an estimation result of the channel quality.

The quantity of retransmissions and the discard-timer period of the MAC layer in the embodiments of the present invention may both be configured as independent parameters. The quantity of retransmissions of the MAC layer may be a quantity of retransmissions of a hybrid automatic repeat request (HARQ) of the MAC layer.

Different quantities of retransmissions and discard-timer periods may be independently configured on the MAC layer. In addition, generally no data packet is actively discarded on the MAC layer, and it may be considered that the discard-timer period of the MAC layer is infinite.

A second aspect provides an apparatus for scheduling a voice service in a packet domain, including: an obtaining unit, configured to obtain at least one value of a first scheduling parameter corresponding to each protocol sublayer of at least two protocol sublayers of L2 of a voice service; a first determining unit, configured to determine a condition needing to be satisfied by quality of service of the voice service; a second determining unit, configured to determine a value of a service scheduling parameter of the voice service based on the condition that is determined by the first determining unit and that needs to be satisfied by the quality of service of the voice service and the at least one value that is obtained by the obtaining unit and that is of the first scheduling parameter corresponding to each protocol sublayer of the at least two protocol sublayers of L2 of the voice service; and a scheduling unit, configured to schedule the voice service based on the value that is determined by the second determining unit and that is of the service scheduling parameter of the voice service.

With reference to the second aspect, in an implementation of the second aspect, the first scheduling parameter includes any one scheduling parameter of the following: a modulation and coding scheme MCS, a quantity of retransmissions, and a discard-timer period; and the obtaining unit is specifically configured to: select, based on two scheduling parameters other than the first scheduling parameter of the foregoing three scheduling parameters, a value from a threshold range corresponding to a first protocol sublayer, to obtain at least one value of a first scheduling parameter of the first protocol sublayer, and calculate, based on the at least one value of the first scheduling parameter of the first protocol sublayer, or configure at least one value of a first scheduling parameter corresponding to another protocol sublayer of the at least two protocol sublayers of L2 of the voice service, where the first protocol sublayer is one of the at least two protocol sublayers of L2 of the voice service.

With reference to the second aspect and the foregoing implementation of the second aspect, in another implementation of the second aspect, the condition needing to be satisfied by the quality of service of the voice service is that a voice quality mean opinion score MOS of the voice service is optimal, and the second determining unit is specifically configured to: determine at least one throughput of the corresponding first protocol sublayer based on the at least one value of the first scheduling parameter of the first protocol sublayer, determine at least one throughput of another protocol sublayer in a one-to-one correspondence to the at least one throughput of the first protocol sublayer, determine corresponding at least one voice quality MOS of the voice service based on the at least one throughput of the first protocol sublayer and the at least one throughput of the another protocol sublayer, and select a value of a first scheduling parameter corresponding to an optimal voice quality MOS of the at least one voice quality MOS of the voice service as the value of the service scheduling parameter of the voice service.

With reference to the second aspect and the foregoing implementations of the second aspect, in another implementation of the second aspect, the condition needing to be satisfied by the quality of service of the voice service is that a throughput of the voice service is maximum, and the second determining unit is specifically configured to: determine at least one throughput of the corresponding first protocol sublayer based on the at least one value of the first scheduling parameter of the first protocol sublayer, determine at least one throughput of another protocol sublayer in a one-to-one correspondence to the at least one throughput of the first protocol sublayer, determine corresponding at least one throughput of the voice service based on the at least one throughput of the first protocol sublayer and the at least one throughput of the another protocol sublayer, and select a value of a first scheduling parameter corresponding to a maximum throughput of the at least one throughput of the voice service as the value of the service scheduling parameter of the voice service.

With reference to the second aspect and the foregoing implementations of the second aspect, in another implementation of the second aspect, the condition needing to be satisfied by the quality of service of the voice service is that a transmission rate of the voice service is maximum, and the second determining unit is specifically configured to: determine at least one value of the service scheduling parameter, where each value of the service scheduling parameter is a maximum value selected from one value of the first scheduling parameter of the first protocol sublayer and one value of a first scheduling parameter of corresponding each of other protocol sublayers, and select a maximum value of the at least one value of the service scheduling parameter as the value of the service scheduling parameter of the voice service.

With reference to the second aspect and the foregoing implementations of the second aspect, in another implementation of the second aspect, the condition needing to be satisfied by the quality of service of the voice service is that a bit error rate of the voice service is minimum, and the second determining unit is specifically configured to: determine at least one value of the service scheduling parameter, where each value of the service scheduling parameter is a minimum value selected from one value of the first scheduling parameter of the first protocol sublayer and one value of a first scheduling parameter of corresponding each of other protocol sublayers, and select a minimum value of the at least one value of the service scheduling parameter as the value of the service scheduling parameter of the voice service.

With reference to the second aspect and the foregoing implementations of the second aspect, in another implementation of the second aspect, the first scheduling parameter is an MCS, and the obtaining unit is specifically configured to: determine at least one fragment quantity of the first protocol sublayer based on a plurality of quantities of retransmissions in a threshold range of the quantity of retransmissions, a plurality of discard-timer periods in a threshold range of the discard-timer period, and an on/off state of a transmission time interval bundling TTIB switch, where each fragment quantity of the first protocol sublayer corresponds to one quantity of retransmissions and one discard-timer period, determine at least one fragment size of the first protocol sublayer based on a maximum buffer data size on the another protocol sublayer, the at least one fragment quantity of the first protocol sublayer, and a header data size of the first protocol sublayer, and determine at least one MCS of the first protocol sublayer based on the at least one fragment size of the first protocol sublayer.

With reference to the second aspect and the foregoing implementations of the second aspect, in another implementation of the second aspect, the first scheduling parameter includes any one scheduling parameter of the following: an MCS, a quantity of retransmissions, a discard-timer period, a PDCP buffer size, and a fragment quantity of an RLC layer.

With reference to the second aspect and the foregoing implementations of the second aspect, in another implementation of the second aspect, the first protocol sublayer is a Radio Link Control RLC layer, and the another protocol sublayer includes a Packet Data Convergence Protocol PDCP layer and a Media Access Control MAC layer.

For operations of corresponding units and/or devices of the foregoing apparatus for scheduling a voice service in a packet domain provided in the second aspect, refer to the steps of the method in the first aspect, and details are not described herein again. For the beneficial technical effects produced by the technical solutions in the second aspect, refer to the technical effects in the method in the first aspect, and details are not described herein again.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

First, a hierarchical structure of an access system of an LTE radio access protocol is briefly described. The access system of the LTE radio access protocol includes three layers: Layer 1 (L1) is a physical layer (PHY), Layer 2 (L2) includes a MAC layer, an RLC layer, and a PDCP layer, and Layer 3 (L3) is a Radio Resource Control (RRC) layer.

The physical layer is the bottom layer in a radio access system and provides services for upper layers by using a transmission channel as an interface. The PDCP layer is located above the RLC layer, and is the topmost sublayer of L2. The PDCP sublayer may process packet data of a network layer carried on an air interface, for example, an Internet Protocol (IP) data stream, or may process a radio resource control (RRC) message on a control plane. The PDCP sublayer may process packet data carried on an interface, compress and encrypt the packet data, and then deliver the packet data to the RLC sublayer. The RLC sublayer is located above the MAC sublayer, and is a part of L2. The RLC sublayer may provide segmentation and retransmission services for users and control data. For example, packets of high-layer protocol data unit (PDU) having different lengths are segmented (at a transmit end) or reassembled (at a receive end) into relatively small RLC load units. A transmission manner of transmitting a data frame on a medium is defined on the MAC layer.

Figure 1:
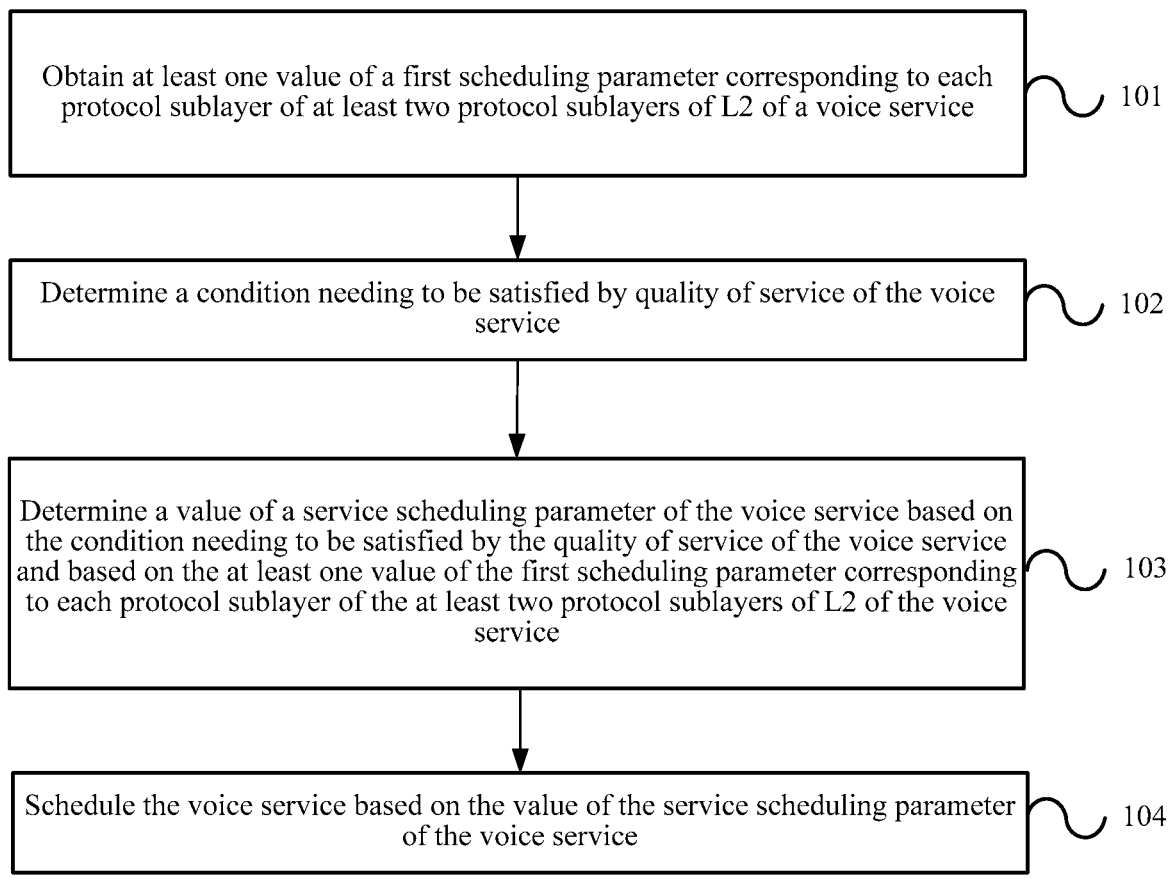
FIG. 1 is a schematic flowchart of a method for scheduling a voice service in a packet domain according to an embodiment of the present invention.

FIG. 1 is a schematic flowchart of a method for scheduling a voice service in a packet domain according to an embodiment of the present invention. The method in FIG. 1 may be performed by a network side device, for example, may be performed by an evolved NodeB (e-NodeB).

101: Obtain at least one value of a first scheduling parameter corresponding to each protocol sublayer of at least two protocol sublayers of L2 of a voice service.

102: Determine a condition needing to be satisfied by quality of service of the voice service.

103: Determine a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service.

104: Schedule the voice service based on the value of the service scheduling parameter of the voice service.

In this embodiment of the present invention, the value of the service scheduling parameter of the voice service is determined based on scheduling parameters of different protocol sublayers of L2 of the voice service and the condition needing to be satisfied by the quality of service of the voice service, and the voice service is scheduled based on the value of the scheduling parameter of the voice service. In this way, transmission quality of a link can be ensured.

This embodiment of the present invention may be applied to an LTE system. In this case, the voice service may be a VoLTE service, and the protocol sublayers of L2 may include an RLC layer, a PDCP layer, and a MAC layer.

The first scheduling parameter in this embodiment of the present invention may be a parameter used in transmission of the voice service. For example, the first scheduling parameter in this embodiment of the present invention may be any one of the following parameters: an MCS, a quantity of retransmissions, a discard-timer period, a PDCP buffer size, and a fragment quantity of the RLC layer.

In this embodiment of the present invention, the first scheduling parameters of the protocol sublayers of the voice service are at the same time one of the foregoing first scheduling parameters. That is, the first scheduling parameters of the protocol sublayers are a same parameter, but values of the first scheduling parameters of the protocol sublayers may be different.

For example, the first scheduling parameter may be an MCS. In this case, an appropriate MCS may be selected based on the condition needing to be satisfied by the quality of service of the voice service and values corresponding to MCSs of the protocol sublayers of L2, to perform adaptive modulation and coding on the transmitted voice service.

For another example, the first scheduling parameter may be a quantity of retransmissions. In this case, an appropriate quantity of retransmissions may be selected based on the condition needing to be satisfied by the quality of service of the voice service and values corresponding to quantities of retransmissions of the protocol sublayers of L2, to perform adaptive retransmission of the transmitted voice service.

For still another example, the first scheduling parameter may be a discard-timer period. In this case, an appropriate discard-timer period may be selected based on the condition needing to be satisfied by the quality of service of the voice service and values corresponding to discard-timer periods of the protocol sublayers of L2, to perform adaptive adjustment of a PDCP buffer size for the transmitted voice service.

When one value is selected for the first scheduling parameter of a first protocol sublayer, a corresponding value may correspondingly be selected for the first scheduling parameter of another protocol sublayer. In this case, the value of the corresponding first scheduling parameter in transmission of the voice service may be determined. When a value is selected in a particular range for the first scheduling parameter of the first protocol sublayer, a plurality of values of the corresponding first scheduling parameter in transmission of the voice service may be obtained. Eventually, one of the plurality of values of the first scheduling parameter in transmission of the voice service may be selected based on the condition needing to be satisfied by the quality of service of the voice service and used as the determined service scheduling parameter to be used for the voice service, to schedule the voice service. Here, the first protocol sublayer may be one of the at least two protocol sublayers of L2 of the voice service.

In this embodiment of the present invention, the condition needing to be satisfied by the quality of service of the voice service may be that voice quality satisfies a particular condition, for example, the voice quality is optimal. The voice quality may be reflected by using the quality of service MOS of the voice service, a throughput of the voice service, a transmission rate of the voice service, a bit error rate of the voice service, and the like. Therefore, the condition needing to be satisfied by the quality of service of the voice service in step 102 in this embodiment of the present invention may be that a quality of service MOS of the voice service is optimal, the throughput of the voice service is maximum, the transmission rate of the voice service is maximum, the bit error rate of the voice service is minimum, or the like, and in addition, may further be a combination of at least two of the foregoing conditions.

When the condition needing to be satisfied by the quality of service of the voice service is that the transmission rate of the voice service is maximum, a maximum value may be selected from a plurality of values of the first scheduling parameter of the voice service and used as the value of the service scheduling parameter of the voice service. When the condition needing to be satisfied by the quality of service of the voice service is that the bit error rate of the voice service is minimum, a minimum value may be selected from a plurality of values of the first scheduling parameter of the voice service and used as the value of the service scheduling parameter of the voice service.

In an embodiment of the present invention, it may be considered that the throughput of the voice service or the voice quality MOS of the voice service depends together on at least three parameters, namely, an MCS, a quantity of retransmissions, and a discard-timer period. When corresponding values are selected for any two parameters of the three parameters, namely, the MCS, the quantity of retransmissions, and the discard-timer period, the throughput or the voice quality MOS may be considered as a function of the third parameter. Therefore, a corresponding value of the third parameter when the throughput or the voice quality MOS is maximum may be found and used as the service scheduling parameter in actual transmission of the voice service. For example, in adaptive scheduling and coding of the transmitted voice service, corresponding values in particular ranges may be selected for the quantity of retransmissions and the discard-timer period. In this case, the throughput or the voice quality MOS of the voice service may be considered as a function of the MCS. A corresponding MCS when the throughput is maximum or the voice quality MOS is optimal may be used as the service scheduling parameter of the voice service, to perform adaptive modulation and coding on the voice service.

With reference to specific embodiments, specific implementations of the embodiments of the present invention are described below by using examples in which the first scheduling parameter is an MCS, a quantity of retransmissions or a discard-timer period. Moreover, the specific embodiments are described by using an example in which the voice service is a VoLTE service, the at least two protocol sublayers of L2 include an RLC layer, a PDCP layer, and a MAC layer, and the first protocol sublayer is an RLC layer.

Embodiment 1 below is described by using an example in which the first scheduling parameter is an MCS.

A network side device may obtain a value of an MCS of an RLC layer, a value of an MCS of a PDCP layer, and a value of an MCS of a MAC layer, determine, based on the values of the MCSs of the three layers and the condition needing to be satisfied by the quality of service of the voice service, a value of an eventual MCS used in actual transmission of a VoLTE service, and eventually schedule the VoLTE service based on the value of the eventual MCS. In this AMC manner, different MCS formats of data transmission need to be defined in a system. The MCS formats correspond to various modulation orders and encoding rates. When a channel condition changes, the system may select different MCS schemes based on channel conditions to perform adaptive modulation and coding to adapt to the impact caused by channel changes, thereby ensuring transmission quality of a link in real time.

When the first scheduling parameter is an MCS, the system may configure or specify respective value ranges for a quantity of retransmissions and a discard-timer period.

A specific manner in which the network side device obtains the value of the MCS of the RLC layer is as follows.

The network side device may obtain a maximum buffer (Buffer) data size on the PDCP layer by using a discard-timer period (Discard Timer) of the PDCP layer. The discard-timer period may be configured by the network side device and delivered to user equipment. The maximum buffer (Buffer) data size on the PDCP layer may be used to calculate a fragment size of the RLC layer, to further determine the value of the MCS of the RLC layer.

The network side device may further estimate, by using a buffer status report (BSR) reported by the user equipment (UE) and an MCS and an encoding rate of VoLTE before a current moment, a current size of data already buffered on the PDCP layer.

A fragment quantity of the RLC layer may be estimated in the following manner: The fragment quantity of the RLC layer is estimated based on the discard-timer period of the PDCP layer, the quantity of retransmissions, and a TTIB switch. For example, if the discard-timer period of the PDCP layer is 100 ms, the quantity of retransmissions is 8, and the TTIB switch is closed, in this case, a corresponding fragment quantity of the RLC layer when retransmission processes are all occupied by the VoLTE service=round (100/(4*8)).

The fragment size of the RLC layer may be estimated in the following manner: the fragment size of the RLC=the maximum buffer data size on the PDCP/the fragment quantity of the RLC+a header data size of the RLC.

When a quantity of resource blocks (RB) is fixed, the fragment sizes of the RLC have a one-to-one correspondence with values of the MCS. That is, the corresponding fragment size of the RLC layer may be determined by using these foregoing parameters (a PDCP buffer status, the quantity of transmissions, the TTIB switch, and the like), to determine the value of the MCS of the RLC layer.

In this embodiment of the present invention, at least one RB may be scheduled, and a quantity of RBs is not fixed. In this case, the fragment size of the RLC layer may depend together on the quantity of RBs and the MCS. In this case, the fragment size of the RLC layer may be obtained based on the foregoing parameters (the PDCP buffer status, the quantity of transmissions, the TTIB switch, and the like) and the quantity of RBs, and the value of the MCS of the RLC layer may then be obtained by using the fragment size of the RLC layer and the quantity of RBs.

The network side device may obtain the value of the MCS of the PDCP layer in the following manner: The throughput of the RLC layer is determined based on the fragment quantity and the fragment size of the RLC layer. For example, the throughput of the RLC layer=the fragment size of the RLC layer*the fragment quantity of the RLC layer. The throughput of the PDCP layer=the throughput of the RLC layer*a transmission efficiency factor. The transmission efficiency factor may depend on the fragment quantity of the RLC layer and a header overhead size of the RLC layer. For example, the transmission efficiency factor=the fragment size of the RLC layer/[(the fragment size of the RLC layer+the header overhead size of the RLC layer)*the fragment quantity]. In addition, the throughput of the PDCP layer may be considered as a linear function of the MCS of the PDCP layer. The value of the MCS of the PDCP layer may be obtained based on the throughput of the PDCP layer.

The network side device may obtain the value of the MCS of the MAC layer in the following manner: The network side device may estimate channel quality, and determine the value of the MCS of the MAC layer based on an estimation result of the channel quality and a channel quality threshold corresponding to each MCS. The channel quality here may be a signal-to-noise ratio, a bit error rate or the like.

The network side device may configure a maximum quantity of retransmissions and a maximum discard-timer period. Different values are selected for the quantity of retransmissions in a range less than or equal to the maximum quantity of retransmissions. Different values are selected for the discard-timer period in a range less than or equal to the maximum period. In this way, values of a plurality of MCSs of the RLC layer may be obtained based on the foregoing method for calculating a value of an MCS.

In this embodiment of the present invention, each MCS of the RLC layer may be selected from a value of one MCS of the RLC layer, a value of one MCS of the PDCP layer and a value of one MCS of the MAC layer that correspond to each MCS of the RLC layer. For example, one maximum value is selected from values of the MCSs of the foregoing three layers and used as a value of one MCS of the corresponding voice service.

In an embodiment of the present invention, the condition needing to be satisfied by the quality of service of the voice service may be that a quality of service MOS of the voice service is optimal. In this case, the voice quality MOS of the VoLTE service may be calculated by using the MCS of the RLC layer, the MCS of the PDCP layer, and the MCS of the MAC layer, and a value of an MCS corresponding to an optimal MOS is selected as a value of an eventual MCS, to schedule the VoLTE service. In this way, voice quality of the VoLTE service can be ensured.

The voice quality MOS of the VoLTE service may be obtained in the following manner: The throughput of the RLC layer, the throughput of the PDCP layer, and the throughput of the MAC layer are estimated based on the MCS of the RLC layer, the MCS of the PDCP layer, and the MCS of the MAC layer. It may be considered that the throughput of each layer and the MCS of the layer have a linear relationship. A minimum value of the throughput of the RLC layer, the throughput of the PDCP layer, and the throughput of the MAC layer is selected as an actual throughput in transmission of the VoLTE service. Eventually, the MOS is determined based on the actual throughput. For example, the MOS=Const−a*max[1−actual throughput/(voice rate*DTX proportion), 0], where Const represents a maximum MOS score in the voice coding scheme and voice rate, and may usually be obtained by training a large quantity of sequences in an offline state.

The throughput of the PDCP layer may be obtained in the following manner: The transmission efficiency factor is determined based on the fragment quantity of the RLC layer and a header overhead size of the RLC layer. The throughput of the PDCP layer may be obtained by multiplying the throughput of the RLC layer and the transmission efficiency factor. The transmission efficiency factor may be obtained in the following manner: The transmission efficiency factor=the fragment size of the RLC layer/[(the fragment size of the RLC layer+the header overhead size of the RLC layer)*the fragment quantity].

For the throughput of the MAC layer, channel quality may be estimated, to obtain an estimation result of the channel quality, and the MCS of the MAC layer is determined based on the estimation result and thresholds of channel quality corresponding to different MCSs.

In an embodiment of the present invention, the condition needing to be satisfied by the quality of service of the voice service may be that the throughput of the voice service is maximum. In this case, actual throughputs in transmission of the VoLTE service may be calculated by using the MCS of the RLC layer, the MCS of the PDCP layer, and the MCS of the MAC layer. An MCS corresponding to a maximum actual throughput may be selected as a value of an eventual MCS, to schedule the VoLTE service. In this way, the actual throughput in transmission of the voice service may be maximum, so that the VoLTE service has desirable voice quality.

In an embodiment of the present invention, when the condition needing to be satisfied by the quality of service of the voice service is that the transmission rate of the voice service is maximum, a maximum value may be selected from values of a plurality of MCSs of the voice service determined by using the values of the MCSs of the foregoing three layers and used as a value of an eventual service scheduling parameter MCS of the voice service. When the condition needing to be satisfied by the quality of service of the voice service is that the bit error rate of the voice service is minimum, a minimum value may be selected from values of a plurality of MCSs of the voice service determined by using the values of the MCSs of the foregoing three layers and used as a value of the service scheduling parameter MCS of the voice service. Different modulation schemes have different features. Low order modulation introduces a relatively large quantity of redundancies and consequently has relatively low actual efficiency, but can ensure relatively high reliability. High order modulation has relatively high efficiency but poor reliability and has relatively high requirements of channel conditions. A relatively high gain can be obtained only when a channel is in a good condition. Whether a maximum value or a minimum value of the MCSs of the three layers is selected for an eventual MCS depends on an actual requirement. For example, to ensure a small bit error rate in transmission of the voice service between the network side device and the user equipment, a relatively small MCS may be selected. To ensure a maximum transmission rate in transmission of the voice service between the network side device and the user equipment, a relatively large MCS may be selected.

In an embodiment of the present invention, if the first scheduling parameter is an MCS, a value of one MCS of the voice service may be determined by using values of three MCSs of the RLC layer, the PDCP layer, and the MAC Layer of L2. An eventually determined value of the service scheduling parameter MCS of the voice service may be a value of one MCS selected from values of a plurality of MCSs of the voice service that are determined based on the foregoing method. Each layer uses the eventually selected value of the MCS as a modulation and coding scheme of the layer.

Embodiment 2 below is described by using an example in which the first scheduling parameter is a quantity of retransmissions.

A HARQ is a retransmission manner that combines forward error correction coding (FEC) and an automatic repeat request (ARQ) on a MAC layer. Keywords of the HARQ are storage, request of retransmission, combination and demodulation. A receiver stores received data when decoding fails, and requests a sender to retransmit data. The receiver combines the retransmitted data and the previously received data before decoding is performed. Here, a particular diversity gain is obtained, so that the quantity of retransmissions is reduced, and a delay is further shortened. The HARQ can efficiently compensate for code errors caused by link adaptation, so that a data transmission rate can be improved, and a data transmission delay can be shortened.

The network side device may obtain a value range of the quantity of retransmissions of the RLC layer, a value range of the quantity of retransmissions of a Packet Data Convergence Protocol PDCP layer, and a value range of the quantity of retransmissions of the MAC layer. One value of the quantity of retransmissions of the voice service is determined based on values of three quantities of retransmissions that have a one-to-one correspondence with the three layers. A plurality of values of the quantity of retransmissions of the voice service may further be determined based on the value ranges of the quantities of retransmissions of the layers, and one value is determined from the plurality of values of the quantity of retransmissions based on the condition needing to be satisfied by the quality of service of the voice service and used as an eventual quantity of retransmissions of the voice service used in actual transmission of a VoLTE service. Eventually, the VoLTE service is scheduled based on the eventual quantity of retransmissions of the voice service. When a channel condition changes, the system may select different quantities of retransmissions based on channel conditions to adapt to the impact caused by channel changes. In this manner, adaptive retransmission adjustment may be performed on the transmission of the VoLTE service, to ensure transmission quality of a link in real time, so that a bit error rate can be reduced, and the transmission rate of data can be improved.

A specific manner in which the network device obtains the quantity of retransmissions of the RLC layer is as follows. The manner in which the network side device obtains a maximum buffer (Buffer) data size on the PDCP layer and a size of data already buffered on the PDCP layer is the same as the manner in Embodiment 1. To avoid repetition, details are not described herein again.

When the first scheduling parameter is a quantity of retransmissions, the network side device may configure a maximum value of an MCS and a maximum discard-timer period. The value of the MCS of the RLC layer may be selected in a range less than or equal to the maximum value of the MCS. The discard-timer period may be selected in a range less than or equal to the maximum period. In this case, a corresponding quantity of retransmissions may be determined based on the MCS and the discard-timer period. For example, when the quantity of resource blocks (RB) is fixed, the value of the MCS of the RLC layer has a one-to-one correspondence with a fragment size of the RLC Layer. When the value of the MCS of the RLC layer is given, the fragment size of the RLC layer may be obtained. Based on the relationship between a fragment size and a fragment quantity in Embodiment 1, a corresponding fragment quantity may be obtained by using a fragment size. Eventually, the quantity of retransmissions is obtained based on an estimation manner of the fragment quantity in Embodiment 1. For specific relationship expressions among the parameters, refer to the description in Embodiment 1. To avoid repetition, details are not described herein again.

The quantities of retransmissions of the RLC layer, the PDCP layer, and the MAC Layer in this embodiment of the present invention may be independently configured. The quantity of retransmissions may be configured based on a delay requirement or the like, and further, in configuration, the value of the quantity of retransmissions is in a particular value range. When the quantities of retransmissions of the three layers are configured as different values, a plurality of throughputs or a plurality of voice quality MOSs in transmission of the VoLTE service may be obtained based on the value of the quantity of retransmissions, and a value of the quantity of retransmissions that makes the throughput maximum or the voice quality MOS optimal is selected as an eventual value of the quantity of retransmissions of the voice service.

In an embodiment of the present invention, the throughput of the VoLTE service may be calculated by using the quantities of retransmissions of the RLC layer, the PDCP layer, and the MAC layer, and a corresponding quantity of retransmissions when the throughput is maximum is selected and determined as the quantity of retransmissions in actual transmission of the VoLTE service.

In an embodiment of the present invention, the voice quality MOS of the VoLTE service may be calculated by using the quantities of retransmissions of the RLC layer, the PDCP layer, and the MAC layer, and a corresponding quantity of retransmissions when the voice quality is optimal is selected and determined as the quantity of retransmissions in actual transmission of the VoLTE service.

In an embodiment of the present invention, if the first scheduling parameter is a quantity of retransmissions, a value of one quantity of retransmissions of the voice service may be determined by using values of three quantities of retransmissions of the RLC layer, the PDCP layer, and the MAC layer of L2. The eventually determined value of the quantity of retransmissions of the voice service may be a value of one quantity of retransmissions selected from values of a plurality of quantities of retransmissions of the voice service that are determined based on the foregoing method. Retransmission is performed on each layer by using the eventually selected value of the quantity of retransmissions.

In an embodiment of the present invention, when the condition needing to be satisfied by the quality of service of the voice service is that the transmission rate of the voice service is maximum, a value of a maximum quantity of retransmissions may be selected from the values of the plurality of quantities of retransmissions of the foregoing voice service that are determined in value ranges of the quantities of retransmissions of the RLC layer, the PDCP layer, and the MAC layer and used as an eventually used value of the quantity of retransmissions for scheduling the voice service. In this way, transmission quality of a link can be ensured by retransmitting voice data for a plurality of times.

In an embodiment of the present invention, when the condition needing to be satisfied by the quality of service of the voice service is that the bit error rate of the voice service is minimum, a value of a minimum quantity of retransmissions may be selected from values of the plurality of quantities of retransmissions of the foregoing voice service that are determined in the value ranges of the quantities of retransmissions of the RLC layer, the PDCP layer, and the MAC layer and used as an eventually used value of the quantity of retransmissions for scheduling the voice service. In this way, a transmission rate can be improved.

Embodiment 3 below is described by using an example in which the first scheduling parameter is a discard-timer period.

A network side device may obtain a value range of a discard-timer period of an RLC layer, a value range of a discard-timer period of a PDCP layer, and a value range of a discard-timer period of a MAC layer. One value of a discard-timer period of the voice service is determined based on the three discard-timer periods that have a one-to-one correspondence with the three layers. Further, a plurality of values of the discard-timer period of the voice service may be determined based on the value ranges of the discard-timer periods of the layers, and one value is determined from the plurality of values of the discard-timer period based on the condition needing to be satisfied by the quality of service of the voice service and used as an eventual value of the discard-timer period of the voice service used in actual transmission of a VoLTE service. Eventually, the VoLTE service is scheduled based on the eventual value of the discard-timer period. When a channel condition changes, different discard-timer periods may be selected based on channel conditions in the system to adapt to impact caused by channel changes. In this manner, a size of data to be buffered of the VoLTE service may be adaptively adjusted, thereby ensuring transmission quality of a link in real time.

A specific manner in which the network device obtains the discard-timer period of the RLC layer is as follows: The manner in which the network side device obtains a maximum buffer data size on the PDCP layer and a size of data already buffered on the PDCP layer is the same as the manner in Embodiment 1. To avoid repetition, details are not described herein again.

When the first scheduling parameter is a discard-timer period, the network side device may configure a value of a maximum MCS and a value of a maximum quantity of retransmissions. When a value is selected for an MCS of the RLC layer in a range less than or equal to the value of the maximum MCS, and a value is selected for the quantity of retransmissions in a range less than or equal to the maximum quantity of retransmissions, a corresponding value of the discard-timer period may be determined based on the value of the MCS and the value of the quantity of retransmissions. For example, values of the MCS of the RLC layer have a one-to-one correspondence with fragment sizes of the RLC layer. Therefore, when a value of the MCS of the RLC layer is given, a fragment size of the RLC layer can be obtained. Based on the relationship between a fragment size and a fragment quantity in Embodiment 1, a corresponding fragment quantity may be obtained by using a fragment size. Eventually, the discard-timer period is obtained based on an estimation manner of the fragment quantity in Embodiment 1. For specific relationship expressions among the parameters, refer to the description in Embodiment 1. To avoid repetition, details are not described herein again.

The values of the discard-timer periods of the RLC layer, the PDCP layer, and the MAC layer in this embodiment of the present invention may be independently configured. A value of a discard-timer period may be configured based on a delay requirement or the like, so that in configuration, the value of the discard-timer period is in a particular value range. When different values are configured for the discard-timer periods of the three layers, different throughputs or voice quality MOSs in transmission of the VoLTE service may be obtained based on the discard-timer periods, and a value of the discard-timer period that makes the throughput maximum or the voice quality MOS optimal is selected as an eventual value of the discard-timer period.

In an embodiment of the present invention, the throughput of the VoLTE service may be calculated by using the discard-timer periods of the RLC layer, the PDCP layer, and the MAC layer, and a corresponding value of the discard-timer period when the throughput is maximum is selected and determined as the value of the discard-timer period in actual transmission of the VoLTE service.

In an embodiment of the present invention, the voice quality MOS of the VoLTE service may be calculated by using the discard-timer periods of the RLC layer, the PDCP layer, and the MAC layer, and a corresponding value of a discard-timer period when the voice quality MOS is optimal is selected and determined as a value of the discard-timer period in actual transmission of the VoLTE service.

When the voice quality parameter is a discard-timer period, a value of a maximum or minimum discard-timer period may be directly selected from the discard-timer periodsof the RLC layer, the PDCP layer, and the MAC layer and used as an eventual value of the discard-timer period used in transmission of the voice service, so that transmission quality of a link can be ensured.

The foregoing three embodiments are respectively described by using examples in which the first scheduling parameter is an MCS, a quantity of retransmissions, and a discard-timer period. The first scheduling parameter in the embodiments of the present invention may further be other parameters such as a buffer data size on the PDCP layer and the fragment quantity of the RLC layer. For the other parameters, a parameter used in actual transmission of the voice service may be obtained based on the corresponding parameters of the RLC layer, the PDCP layer, and the MAC layer, to perform adaptive adjustment of the parameter in transmission of the VoLTE service, thereby ensuring transmission quality of a link.

When the method for scheduling a voice service in this embodiment of the present invention is applied to QCI 1 services or QCI 2 services, transmission quality of a link can be ensured more effectively.

Figure 2:
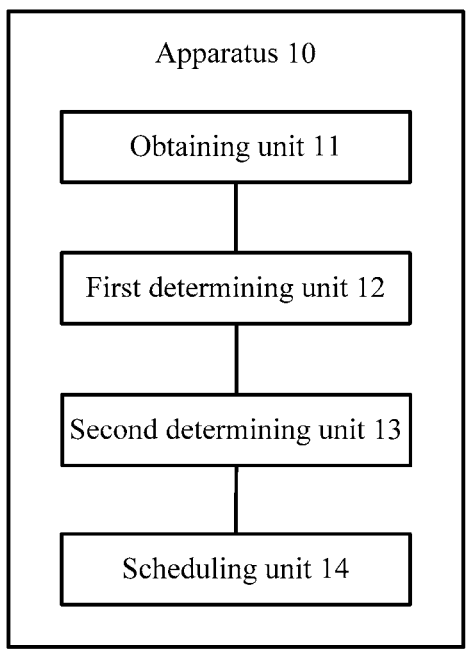
FIG. 2 is a block diagram of an apparatus for scheduling a voice service in a packet domain according to an embodiment of the present invention.

FIG. 2 is a block diagram of an apparatus 10 for scheduling a voice service in a packet domain according to an embodiment of the present invention. The apparatus 10 for scheduling a voice service in a packet domain in FIG. 2 may include an obtaining unit 11, a first determining unit 12, a second determining unit 13, and an scheduling unit 14.

The obtaining unit 11 is configured to obtain at least one value of a first scheduling parameter corresponding to each protocol sublayer of at least two protocol sublayers of L2 of a voice service.

The first determining unit 12 is configured to determine a condition needing to be satisfied by quality of service of the voice service.

The second determining unit 13 is configured to determine a value of a service scheduling parameter of the voice service based on the condition that is determined by the first determining unit and that needs to be satisfied by the quality of service of the voice service and the at least one value that is obtained by the obtaining unit and that is of the first scheduling parameter corresponding to each protocol sublayer of the at least two protocol sublayers of L2 of the voice service.

The scheduling unit 14 is configured to schedule the voice service based on the value that is determined by the second determining unit and that is of the service scheduling parameter of the voice service.

In this embodiment of the present invention, the value of the service scheduling parameter of the voice service is determined based on scheduling parameters of different protocol sublayers of L2 of the voice service and the condition needing to be satisfied by the quality of service of the voice service, and the voice service is scheduled based on the value of the scheduling parameter of the voice service. In this way, transmission quality of a link can be ensured.

The apparatus for scheduling a voice service in a packet domain according to this embodiment of the present invention may correspond to the method for scheduling a voice service in a packet domain in the embodiment of the present invention in FIG. 1. Moreover, the units/modules and the foregoing other operations and/or functions of the apparatus are separately used to implement the corresponding procedures performed in the method shown in FIG. 1. For brevity, details are not described herein again.

Figure 3:
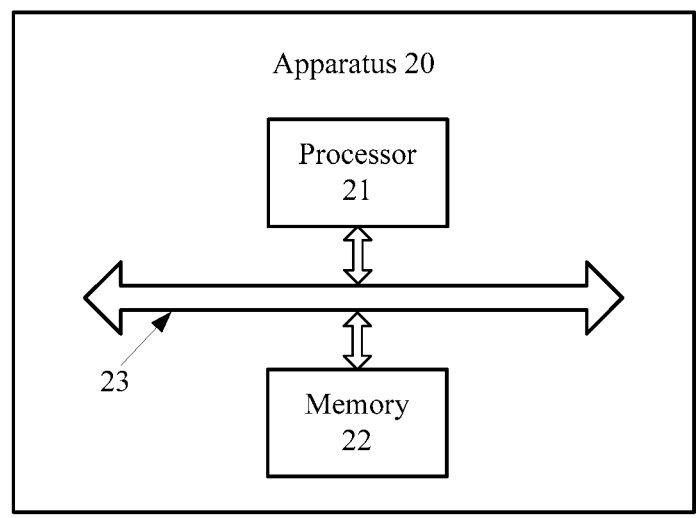
FIG. 3 is a block diagram of an apparatus for scheduling a voice service in a packet domain according to another embodiment of the present invention.

FIG. 3 is a block diagram of an apparatus 20 for scheduling a voice service in a packet domain according to another embodiment of the present invention. The apparatus 20 includes a processor 21, a memory 22, and a bus system 23. The processor 21 is connected to the memory 22 by using the bus system 23. The memory 22 is configured to store an instruction. The processor 21 is configured to execute the instruction stored in the memory 22, to cause the apparatus 20 to perform the steps in the procedure of the method in FIG. 1.

The methods disclosed in the foregoing embodiments of the present invention may be applied to the processor 21 or implemented by the processor 21. In an implementation process, steps in the foregoing methods may be completed by using an integrated logical circuit of hardware in the processor 21 or instructions in a form of software in the processor 21. The processor 21 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of the present invention. A general-purpose processor may be a micro-processor or any conventional processor. The steps of the methods disclosed with reference to the embodiments of the present invention may be directly performed by a hardware processor, or may be performed by using a combination of hardware in the processor and a software module. The software module may be located in a mature storage medium in the art, such as a random-access memory, a flash memory, a read-only memory, a programmable read-only memory, an electrically-erasable programmable memory, or a register. The storage medium is located in the memory 22, and the processor 21 reads information in the memory 22 and completes the steps in the foregoing methods in combination with hardware of the processor 21.

Specifically, the processor 21 is configured to: obtain at least one value of a first scheduling parameter corresponding to each protocol sublayer of at least two protocol sublayers of L2 of a voice service, determine a condition needing to be satisfied by quality of service of the voice service, determine a value of a service scheduling parameter of the voice service based on the condition needing to be satisfied by the quality of service of the voice service and based on the at least one value of the first scheduling parameter corresponding to each protocol sublayer of the at least two protocol sublayers of L2 of the voice service, and eventually schedule the voice service based on the value of the service scheduling parameter of the voice service.

In this embodiment of the present invention, the value of the service scheduling parameter of the voice service is determined based on scheduling parameters of different protocol sublayers of L2 of the voice service and the condition needing to be satisfied by the quality of service of the voice service, and the voice service is scheduled based on the value of the scheduling parameter of the voice service. In this way, transmission quality of a link can be ensured.

The apparatus for scheduling a voice service in a packet domain according to this embodiment of the present invention may correspond to the method for scheduling a voice service in a packet domain in the embodiment of the present invention in FIG. Moreover, the units/devices and the foregoing other operations and/or functions of the apparatus are separately used to implement the corresponding procedures performed in the method shown in FIG. 1. For brevity, details are not described herein again.

It should be understood that "one embodiment" or "an embodiment" mentioned in the whole specification means that particular features, structures, or characteristics related to the embodiment are included in at least an embodiment of the present invention. Therefore, "in one embodiment" or "in an embodiment" that appears throughout the whole specification does not necessarily mean a same embodiment. Moreover, the particular characteristic, structure or property may be combined in one or more embodiments in any proper manner.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

The present invention is described in detail with reference to the accompany drawings and in combination with the exemplary embodiments, but the present invention is not limited to this. Various equivalent modifications or replacements can be made to the embodiments of the present invention by a person of ordinary skill in the art without departing from the essence of the present invention, and the modifications or replacements shall fall within the scope of the present invention.

What is claimed is:

1. A method for scheduling a voice service in a packet domain, comprising:
    obtaining one or more values of a first scheduling parameter of a Radio Link Control (RLC) layer and one or more values of a first scheduling parameter of a protocol sublayer of Layer (L2) other than the RLC layer, wherein the protocol sublayer of L2 other than the RLC layer comprises a Packet Data Convergence Protocol (PDCP) layer and a Media Access Control (MAC) layer;
    determining a condition needing to be satisfied by quality of service of the voice service;
    determining a value that satisfies the condition, from the one or more values of the first scheduling parameter of the RLC layer and the one or more values of the first scheduling parameter of a protocol sublayer of L2 other than the RLC layer, as a value of a service scheduling parameter of the voice service; and
    scheduling the voice service based on the determined value of the service scheduling parameter of the voice service;
    wherein the condition needing to be satisfied by the quality of service of the voice service comprises at least one of the following:
        a quality of service mean opinion score (MOS) of the voice service is optimal;
        a throughput of the voice service is maximum;
        a transmission rate of the voice service is maximum; or
        a bit error rate of the voice service is minimum.

2. The method according to claim 1, wherein the one or more values of the first scheduling parameter of a protocol sublayer of the L2 other than the RLC layer is determined according to the one or more values of the first scheduling parameter of the RLC layer.

3. The method according to claim 1, wherein the condition needing to be satisfied by the quality of service of the voice service is that a quality of service MOS of the voice service is optimal; and wherein the determining a value that satisfies the condition, from the one or more values of the first scheduling parameter of the RLC layer and the one or more values of the first scheduling parameter of a protocol sublayer of L2 other than the RLC layer as a value of a service scheduling parameter of the voice service comprises:
calculating each quality of service MOS of the voice service according to each value of the one or more values of the first scheduling parameter of the RLC layer and the one or more values of the first scheduling parameter of a protocol sublayer of L2 other than the RLC layer; and
selecting a value of the one or more values of the first scheduling parameter of the RLC layer and the one or more values of the first scheduling parameter of a protocol sublayer of L2 other than the RLC layer corresponding to an optimal MOS as the value of the service scheduling parameter of the voice service.

4. The method according to claim 1, wherein the condition needing to be satisfied by the quality of service of the voice service is that a throughput of the voice service is maximum; and
wherein the determining a value that satisfies the condition, from the one or more values of the first scheduling parameter of the RLC layer and the one or more values of the first scheduling parameter of a protocol sublayer of L2 other than the RLC layer as a value of a service scheduling parameter of the voice service comprises:
calculating each throughput of the voice service according to each value of the one or more values of the first scheduling parameter of the RLC layer and the one or more values of the first scheduling parameter of a protocol sublayer of L2 other than the RLC layer; and
selecting a value of the one or more values of the first scheduling parameter of the RLC layer and the one or more values of the first scheduling parameter of a protocol sublayer of L2 other than the RLC layer corresponding to a maximum throughput of the voice service as the value of the service scheduling parameter of the voice service.

5. The method according to claim 1, wherein the condition needing to be satisfied by the quality of service of the voice service is that a transmission rate of the voice service is maximum, wherein the value of the service scheduling parameter of the voice service is a maximum value of the one or more values of the first scheduling parameter of the RLC layer and the one or more values of the first scheduling parameter of a protocol sublayer of L2 other than the RLC layer.

6. The method according to claim 1, wherein the condition needing to be satisfied by the quality of service of the voice service is that a bit error rate of the voice service is minimum, wherein the value of the service scheduling parameter of the voice service is a minimum value of the one or more values of the first scheduling parameter of the RLC layer and the one or more values of the first scheduling parameter of a protocol sublayer of L2 other than the RLC layer.

7. The method according to claim 1, wherein the first scheduling parameter comprises any one scheduling parameter of the following: an MCS, a quantity of retransmissions, a discard-timer period, a PDCP buffer size, and a fragment quantity of the RLC layer.

8. An apparatus, comprising:
at least one processor; and
a non-transitory computer-readable storage medium coupled to the at least one processor and storing programming instructions for execution by the at least one processor, wherein the programming instructions instruct the at least one processor to:
obtain one or more values of a first scheduling parameter of a Radio Link Control (RLC) layer and one or more values of a first scheduling parameter of a protocol sublayer of Layer 2 (L2) other than the RLC layer, wherein the protocol sublayer of L2 other than the RLC layer comprises a Packet Data Convergence Protocol (PDCP) layer and a Media Access Control (MAC) layer;
determine a condition needing to be satisfied by quality of service of a voice service;
determine a value that satisfies the condition, from the one or more values of the first scheduling parameter of the RLC layer and the one or more values of the first scheduling parameter of a protocol sublayer of L2 other than the RLC layer, as a value of a service scheduling parameter of the voice service; and
schedule the voice service based on the determined value that is of the service scheduling parameter of the voice service;
wherein the condition needing to be satisfied by the quality of service of the voice service comprises one or more of the following:
a quality of service mean opinion score (MOS) of the voice service is optimal;
a throughput of the voice service is maximum;
a transmission rate of the voice service is maximum; or
a bit error rate of the voice service is minimum.

9. The apparatus according to claim 8, wherein one or more values of the first scheduling parameter of a protocol sublayer of the L2 other that the RLC layer is determined according to the one or more values of the first scheduling parameter of the RLC layer.

10. The apparatus according to claim 8, wherein the condition needing to be satisfied by the quality of service of the voice service is that a quality of service MOS of the voice service is optimal, and
wherein the programming instructions instruct the at least one processor to:
calculate each quality of service MOS of the voice service according to each value of the one or more values of the first scheduling parameter of the RLC layer and the one or more values of the first scheduling parameter of a protocol sublayer of L2 other than the RLC layer; and
select a value of the one or more values of the first scheduling parameter of the RLC layer and the one or more values of the first scheduling parameter of a protocol sublayer of L2 other than the RLC layer corresponding to an optimal MOS as the value of the service scheduling parameter of the voice service.

11. The apparatus according to claim 8, wherein the condition needing to be satisfied by the quality of service of the voice service is that a throughput of the voice service is maximum, and
wherein the programming instructions instruct the at least one processor to:
calculate each throughput of the voice service according to each value of the one or more values of the first scheduling parameter of the RLC layer and the one or more values of the first scheduling parameter of a protocol sublayer of L2 other than the RLC layer; and select a value of the one or more values of the first scheduling parameter of the RLC layer and the one or more values of the first scheduling parameter of a protocol sublayer of L2 other than the RLC layer corresponding to a maximum throughput of the voice service as the value of the service scheduling parameter of the voice service.

12. The apparatus according to claim 8, wherein the condition needing to be satisfied by the quality of service of the voice service is that a transmission rate of the voice service is maximum, wherein the value of the service scheduling parameter of the voice service is a maximum value of the one or more values of the first scheduling parameter of the RLC layer and the one or more values of the first scheduling parameter of a protocol sublayer of L2 other than the RLC layer.

13. The apparatus according to claim 8, wherein the condition needing to be satisfied by the quality of service of the voice service is that a bit error rate of the voice service is minimum, wherein the value of the service scheduling parameter of the voice service is a minimum value of the one or more values of the first scheduling parameter of the RLC layer and the one or more values of the first scheduling parameter of a protocol sublayer of L2 other than the RLC layer.

14. The apparatus according to claim 8, wherein the first scheduling parameter comprises any one scheduling parameter of the following: an MCS, a quantity of retransmissions, a discard-timer period, a PDCP buffer size, and a fragment quantity of the RLC layer.

* * * * *